United States Patent [19]

Delcoigne et al.

[11] 4,334,786
[45] Jun. 15, 1982

[54] PROCESS AND MECHANISM FOR EVOLUTIVE PULP FLOW REGULATION

[75] Inventors: Adrien Delcoigne, Chantilly; Jacques Lanneau, Breuil le Vert, both of France

[73] Assignee: Saint Gobain Industries, Neuilly, France

[21] Appl. No.: 3,415

[22] Filed: Jan. 15, 1979

[30] Foreign Application Priority Data

Feb. 8, 1978 [FR] France .................. 78 03473
Feb. 8, 1978 [FR] France .................. 78 03474
Feb. 8, 1978 [FR] France .................. 78 03475

[51] Int. Cl.³ .............. B01F 7/22; B01F 11/00; B01F 15/02; B01F 15/04
[52] U.S. Cl. ..................... 366/132; 137/403; 222/203; 251/35; 264/69; 264/40.4; 366/138; 366/141; 366/152; 366/153; 366/154; 425/148
[58] Field of Search .............. 366/18, 21, 141, 131, 366/153, 192, 211, 138, 275, 132, 1, 2, 69, 53, 341, 9, 348, 349, 336; 137/403, 408; 251/35, 5; 264/69, 404; 425/148, 456, 145; 222/203

[56] References Cited

U.S. PATENT DOCUMENTS 2,574,233 11/1951 Bean ............................ 366/18
3,334,675 8/1967 Satake ........................... 99/489
3,433,245 3/1969 Cymbalisty .................. 137/242
3,479,001 11/1969 Dower ............................ 251/5
3,588,054 6/1971 Herman ......................... 366/69
3,643,912 2/1972 Livingston ..................... 251/5
3,759,483 9/1973 Baxter ............................ 251/5

FOREIGN PATENT DOCUMENTS

826066 12/1937 France .
1046077 7/1953 France .
1475741 2/1967 France .
2055795 4/1971 France .
2197479 3/1974 France .
620173 3/1949 United Kingdom .

Primary Examiner—Robert W. Jenkins
Attorney, Agent, or Firm—Harding, Earley & Follmer

[57] ABSTRACT

The present invention is concerned with regulation of evolutive pulp. It offers a regulation process and mechanism, said mechanism including an elastic shape-changing pneumatic valve, valve opening control means, and modulating means causing a variation of said valve opening either way from an opening setting achieved through control means. The present invention can be applied to a continuous process for mixing plaster.

31 Claims, 8 Drawing Figures

PROCESS AND MECHANISM FOR EVOLUTIVE PULP FLOW REGULATION

TECHNICAL FIELD

This invention is in the field of flow control.

BACKGROUND OF PRIOR ART

The present invention is concerned with regulation of evolutive pulps. Evolutive pulps are liquids in which a certain reaction resulting in a physical or chemical transformation takes place such as producing a solid phase or modifying the characteristics of the solid phase initially carried by said liquid. One example of evolutive pulp would be plaster powder mixed with water. This invention can be applied to the hydraulic binders industry, plaster industry and generally to any industry in which there is a need to control the flow rate of evolutive pulps carried through piping.

In order to cutoff, introduce variations, or regulate a liquid flow rate to a given value, the use of elastic shape-changing valves is widespread. Such valves consist of a rigid tubular housing and a cylindrical inner cell, such as a sleeve, with enough elastic property to change shape. Valve closing is achieved through compression of the elastic sleeve by either the mechanical effect of a screw-nut-flywheel mechanism or by the effect of a pressurized fluid, such as water or air, sent between the housing and sleeve. When no mechanical or pneumatic action is exerted upon the sleeve, the valve allows direct passage of the product at full rate of flow, when the sleeve is subjected to a shape-changing action, the aperture of the sleeve opening is reduced and the valve allows only a reduced flow rate of the product. With a sufficiently strong mechanical or pneumatic action, the elastic walls of the sleeve eventually become joined, thus completely closing the valve.

Such manually controlled valves are recommended for viscous, pasty or abrasive liquids. But in the case of evolutive pulps, deposits form in the narrow channel created by the compressed sleeve, deposits which change the size of the sleeve aperture alter the valve setting and eventually create an obstruction.

It is also known to pulsate elastic shape-changing valves to keep material in a liquid state and to use large elastic sleeves to break up solids.

BRIEF SUMMARY OF THE INVENTION

The invention is aimed at preventing the deposit of evolutive pulps in a narrow channel created by a valve and is characterized by the fact that it comprises superimposing a pulsating signal on a regulation signal which is advantageous in maintaining a constant amount of ingredients in a mixing container continuously supplied with evolutive pulp ingredients.

The invention offers as well a regulating mechanism for the rate of flow of evolutive pulps characterized by the fact that it includes a flow rate regulating valve, valve opening control means and modulating means causing a variation of the valve opening either way from an opening setting fixed by the control means which is advantageous in maintaining a constant amount of ingredients in a mixing container continuously supplied with evolutive pulp ingredients.

According to another characteristic, the invention's mechanism is characterized by the fact that the flow rate regulating valve is an elastic shape-changing pneumatic valve, consisting of a rigid housing, of a inner elastic sleeve, and of a valve opening control fluid intake between rigid housing and sleeve.

In accordance with the process and apparatus of the invention, the amount of material is maintained constant in a mixing tank, and the time of the material in the mixing tank is maintained constant, by supplying a regulating or sensing signal to a discharge control valve and superimposing a pulsating or vibrating or modulating signal on the sensing signal. This vibrating signal prevents deposit of material in the valve. Advantageously, the sensing signal is responsive to the weight of the mixing tank which preferably is free from upstream and downstream equipment. In accordance with the invention, the vibrating or pulsating signal may be caused by vibration of the mixing tank which is advantageous because it keeps the valve sleeve vibrating to prevent deposit of material on the interior surface of the sleeve. If necessary, a modulating piston may be used instead of, or to supplement, the pulsating signal supplied by the motor vibrations. The motor shaft is seldom exactly vertical, and therefore creates vibrations. Also, the irregular delivery of the gypsum powder to the mixing tank creates vibrations.

The pneumatic valve of the invention employs an inner elastic sleeve that is star-shaped in cross-section when subjected to pressure, which is advantageous because the star-shape makes deposit of the material more difficult.

DETAILED DESCRIPTION OF THE INVENTION

Figure 1:
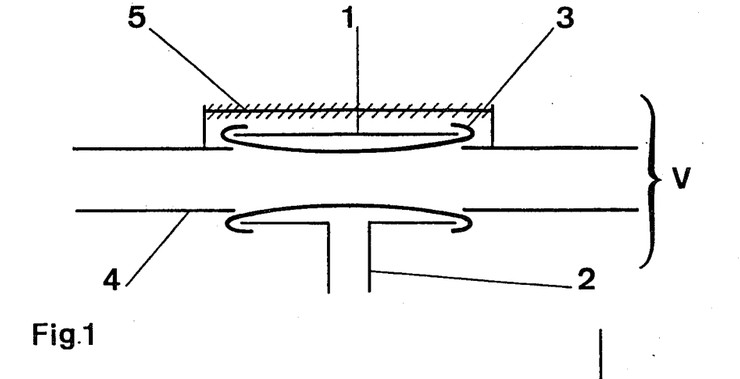
FIG. 1 is a schematic view of a shape-changing elastic pneumatic valve.

FIG. 1 shows an elastic shape-changing valve V of the type used in our invention. It comprises a housing or rigid casing 1 of cylindrical shape with a lateral control fluid intake pipe 2, and an inner elastic sleeve 3, of for example rubber, also cylindrical and whose section is equal to that of the internal diameter of the rigid casing, or slightly stretched to contact the inner surface of the rigid casing. The sleeve 3 assumes the star-shape cross-section of FIG. 2 when a very low air pressure is applied to the outer surface of the sleeve 3. The ends of said sleeve 3 may be secured to casing 1 by being turned over the edge of casing 1 and tightened by securing rings. As shown in FIG. 1, each end of sleeve 3 is held to casing 1 by a piece of tube 4 with the same shape as casing 1 but with slightly smaller dimension which is pushed in at each end of valve V. The tube 4 elements are connected by a threaded rods-nuts assembly 5 which is also used when securing rings are employed.

Figure 2:
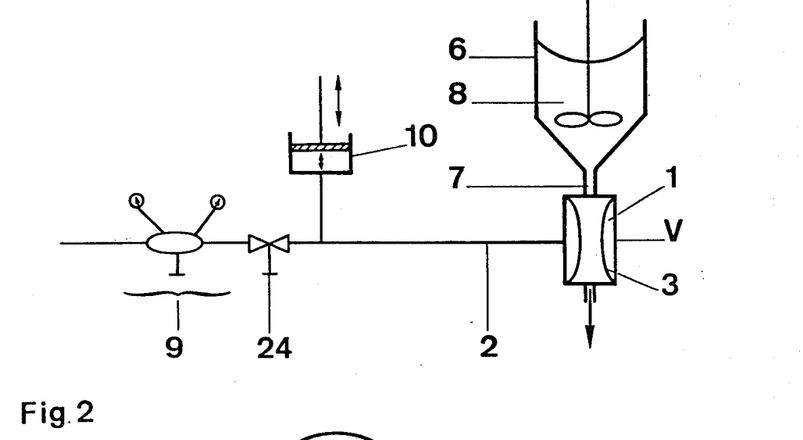
FIG. 2 is a schematic view of a setting mechanism for the rate of flow of evolutive pulps.

Advantageously, the sleeve 3 has a star configuration in cross-section as shown in FIG. 2 when under pressure. This configuration keeps the sleeve 3 vibrating to prevent deposit of mix on that surface. For example, the inscribed diameter of the sleeve varies from 21 mm to 15 mm when the air pressure varies from 100 to 300 mm of mercury. By way of example, in a typical sleeve of 0.8 mm thickness, its inscribed diameter varies from 21 mm to 15 mm when the controlling air pressure goes from 100 to 300 mm Hg where the initial at rest diameter is 32 mm and length is 82 mm. By inscribed diameter is meant the diameter of the inscribed circle 3a in the star-shaped sleeve 3b in FIG. 3.

FIG. 2 shows a mechanism for the setting of evolutive pulp flow rates which is in accordance with the invention. A mixer 6 is provided in its lower part with a drainage opening on which is fitted a pipe 7 equipped with the flow rate regulating valve V of FIG. 1.

Mixer 6 is continuously filled with an evolutive pulp product 8 whose flow rate regulation through pipe 7 is sought. This filling may be carried out using the apparatus disclosed in our copending patent applications entitled "Continuous Process Mixing of Pulverized Solids and Liquids and Mixing Apparatus" and "Plaster Board and Process and Device for Making Plaster Board" filed concurrently herewith which are incorporated herein by reference. Lateral control fluid intake pipe 2 of control valve V is supplied with compressed air, the pressure of this air being controlled by a pressure regulating assembly 9 set to a value corresponding to a set rate of flow of product 8 through valve V, therefore to a set change of shape of inner sleeve 3.

In accordance with the invention, a piston 10 actuated with a reciprocating motion and modulating the pressure of compressed air sent between housing 1 and elastic sleeve 3 of valve V is installed on control fluid intake pipe 2. Piston 10 may be reciprocated, for example, by a crank on a motor driven shaft (not shown) to create a modulation of the pressure in the valve V. The modulation frequency preferably may be about 2.4 Hz and may be in a width range on both sides of 2.4 Hz.

In other types of construction, piston 10 may be replaced by any other mechanism able to induce a modulation of valve V control fluid pressure.

Figure 3:
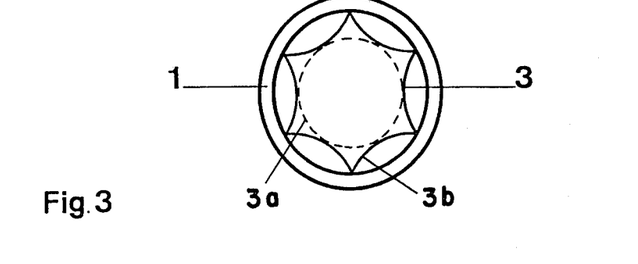
FIG. 3 is a schematic section of the valve in FIG. 1 illustrating its operation.

The FIG. 2 mechanism operates as follows: compressed air, whose pressure is set by pressure regulating assembly 9 to a preset value Po, is sent through valve V to control pipe 2. This air pressurizes sleeve 3, which assumes a star-shape as represented in FIG. 3, and the aperture of the channel in valve V for product 8 contained in container 6 becomes thus restricted. The selected flow rate to maintain the desired level of product 8 is obtained by the setting of pressure regulating assembly 9.

Alternating motion actuated piston 10 creates a modulation of the pressure in valve V above and below the value Po, which causes a periodic compression and release of sleeve 3. In this way, the sleeve is continuously in motion and this prevents any accumulation of product 8 when valve V forms a narrow channel.

Figure 4:
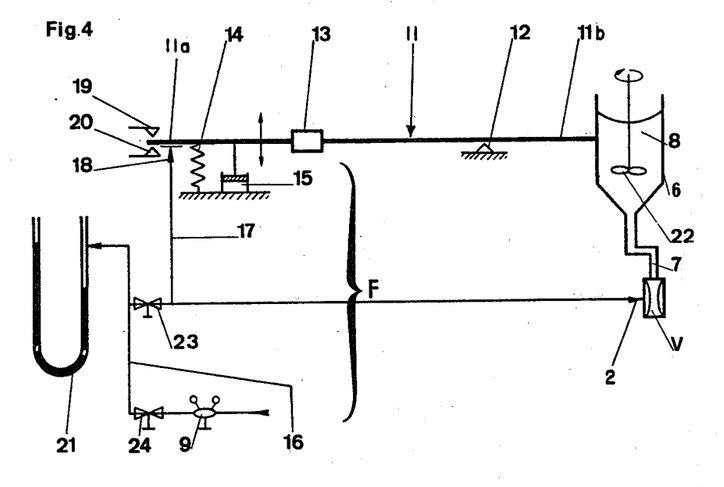
FIG. 4 is a schematic view of a regulating mechanism for the rate of flow of evolutive pulps.

FIG. 4 shows an evolutive pulp flow rate regulating mechanism in accordance with the invention.

Product 8 (or its separate constituents) is continuously introduced into mixer 6 at a constant rate by conventional mechanism (not shown). Mixer 6 is provided in its lower part with a drainage opening connected to pipe 7 equipped with valve V. The mixer 6 is supported by an arm 11b of a force balance beam 11 in equilibrium on fulcrum 12, the equilibrium of beam 11 being achieved through a spring 14 and a counterweight 13 acting upon the other balance 11 beam arm.

The counterweight's position on beam arm 11 may be adjusted so that equilibrium is attained for any level of product 8 in the mixer 6. A damping piston 15 is connected to beam arm 11a. The setting control of valve V is obtained through a pneumatic escape mechanism F. Such a mechanism F has a fluid, generally air, under a pressure Po, and supplies the air to pipe 16, that is, connected to control fluid intake pipe 2. A pipe 17 also is connected with pipe 16 and vents the air through a nozzle 18 and directs the air against the bottom of beam arm 11a. Two safety stops 19 and 20 are placed above and below the beam end 11a, thus limiting movement of beam arm 11a and the mixer's weight variations in relation with the selected weight adjusted with counterweight 13. Pressure P is regulated through pressure regulator 9 and measured by a pressure gauge 21 represented as a mercury containing U-shaped tube.

Product 8 is stirred inside mixer 6 by a mixing impeller or agitator 22.

This evolutive pulp flow rate regulating mechanism operates as follows: the mixer 6 receives a supply of product 8 in continuous process. Said product 8 is stirred by agitator 22 and flows through discharge pipe 7 in a continuous process, the flow rate being regulated by valve V.

The pressure of air in pipe 16 is set using pressure regulating 9 at value Po in order to obtain, when escape flow through valve 18 is shut off (by moving manually the tip of beam arm 11a onto nozzle 18), a position of valve V providing a product flow rate below the selected flow rate, and when escape flow through nozzle 18 is increased to its maximum (by having a beam tip of arm 11a touching top safety stop 19), a position of valve V such that the product flow rate is higher than the one selected. Then the position of counterweight 13 on beam arm 11a is adjusted so that beam 11 assumes a position intermediate its position completely blocking flow through nozzle 18 and its position against stop 19, in which position the selected flow rate of product 8 is achieved which is equal to the flow rate at which product 8 is introduced into mixer 6 in order to keep constantly a set amount of product 8 in mixer 6.

Any weight variation of product 8 in mixer 6 causes a deflection of balance beam 11. Thus, an overweight results in increasing the distance between beam arm 11a and nozzle 18, therefore increasing the flow of air escaping from nozzle 18 and reducing the pressure of the air between sleeve 3 and housing 1 of valve V. Thus sleeve 3 expands to increase the size of the valve opening, to increase the flow of product through the valve V increases, so that mixer 6 empties more rapidly until the weight of product 8 is again at the desired point at which time beam 11 has returned to its original position, thus regaining equilibrium. In the opposite case, too small a weight of mixture in mixer 6 results in contracting sleeve 3 of valve V and therefore in greater holding back of product 8 in mixer 6, which results in regaining equilibrium at a predetermined weight of product 8 in mixer 6.

In the mechanism illustrated in FIG. 2, a piston 10 induces a modulation of the pressure of control air sent to valve V. In the case of the FIG. 4 mechanism, which is preferred, vibrations in the pressure of control air are induced by vibrations from the mixer 6 including vibrations from agitator 22. These vibrations result in oscillations of beam 11 and, consequently variations in the amount of air escaping through nozzle 18, causing pulsations in pressure of the air sent to valve V. Thus, sleeve 3 vibrates and contracts and expands rapidly. Under the effect of pressure it assumes a star-shape, and the vibrations from mixer 6 vibrates the valve sleeve 3 rapidly, thus preventing formation of deposits of product 8 on the interior surface of sleeve 3. Sleeve 3 can be made with any leakproof elastic substance, but it is necessary, before any setting of the mechanism, to determine the elastic characteristics of material used by establishing a diagram giving valve aperture size against pressure.

The elastic sleeve can be made with a very pliable inner tube material. This gives a light valve, reacting to a low pressure of the order of 0.25 bar (7.38 in.Hg), total pressure in the escape pneumatic system being of the order of 1 bar (29.52 in.Hg).

Damping device 15 is selected so that it allows preferred vibrations to be felt. A valve 23 is in the pneumatic circuit downstream from the pressure gauge before said circuit divides into pipes 16 and 17. Thus, once operating conditions of the installation are determined, it is easier to restart the installation after stoppage without any need to proceed with new settings. Valve 23 is closed and pressure is set at value Po already known. Safety stop may be connected with a valve that shuts off product 8 supply to mixer 6 when beam tip 11 makes contact with it.

A constant flow needle valve 24 is downstream of pressure regulating assembly 9 and acts to give constant flow and prevent back up from downstream.

Figure 5:
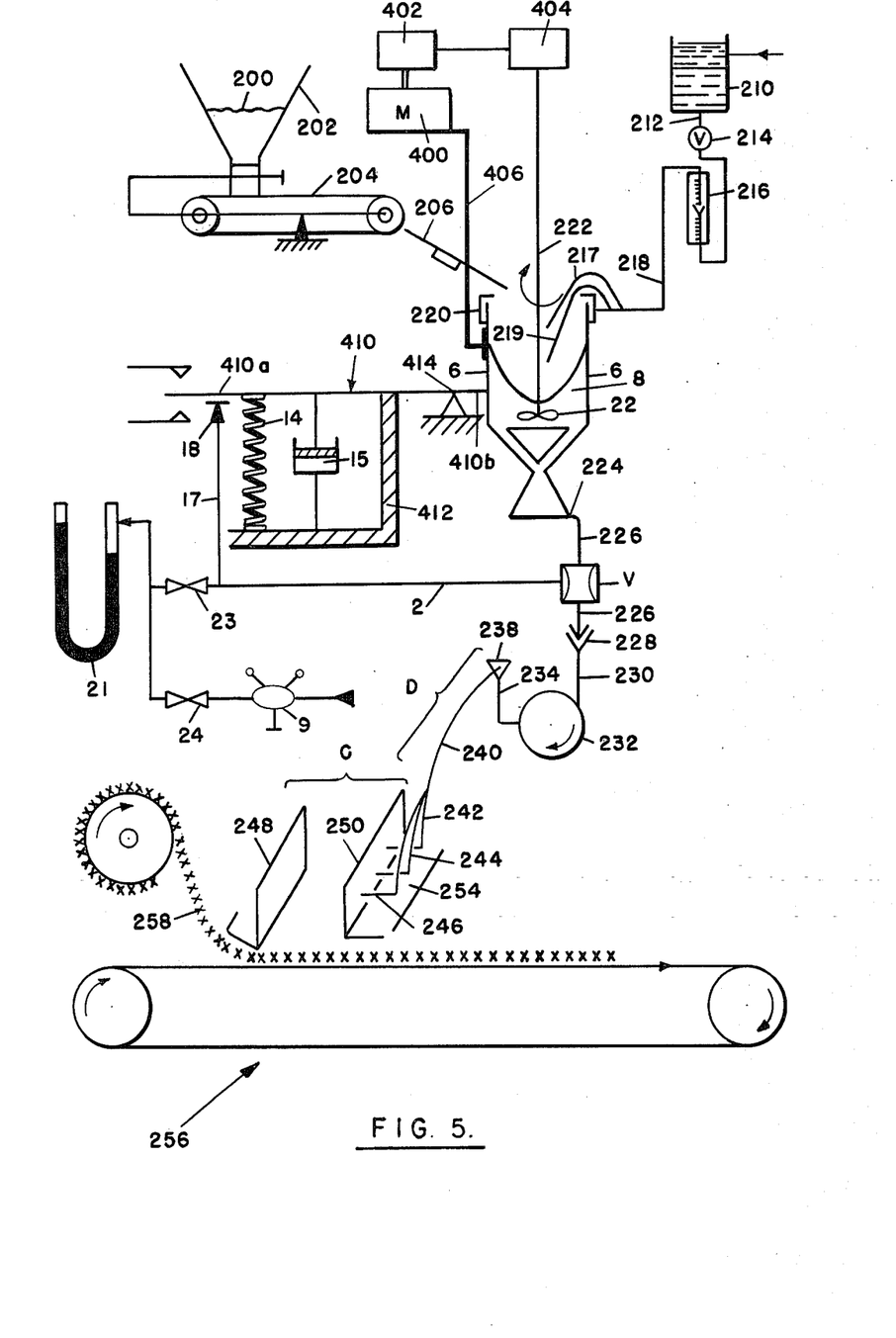
FIG. 5 is a schematic view of apparatus in accordance with the invention for making a plasterboard building component.

FIG. 5 shows apparatus in accordance with the invention for making reinforced plasterboard building components. Pulverized plaster powder 200 contained in a hopper 202 is distributed on a constant weight weight-sensitive conveyor belt 204 set beforehand for a predetermined constant flow rate of plaster powder. Conveyor belt 204 discharges the plaster powder onto a vibrating pouring screened spout 206 which delivers it into mixer 6 having an agitator 22. A water reservoir 210 discharges into a line 212 having a valve 214 with line 212 being connected to a flow meter 216 discharging into a line 218 which in turn discharges into overflow trough 220 secured about the periphery of mixer 6 and adapted to overflow to supply mixer 6 with water adjacent the inner wall of mixer 6 to wash the inner wall. A line 217 branches off from line 218 and washes the upper portion of impeller shaft 222, and a line 219 branches off from line 218 and washes the lower portion of impeller shaft 222. In this manner plaster powder and water are supplied to mixer 6 at a constant rate to mix together.

The plaster powder-water mixture 8 (the evolutive pulp) discharges through the open lower end 224 of mixer 6 into pipe 226 controlled by valve V. Pipe 226 discharges into a receiving container 228 to permit the weighing of mixer 6 separately from the apparatus downstream of pipe 226. Container 228 is connected by a pipe 230 to a pump 232 that discharges into a pipe 234 supplying a distributing container 238. Distributing container 238 discharges into a line 240 that supplies lines 242, 244 and 246 which discharge horizontally into a pouring head C having an upstream plate 248 and a downstream plate 250 connected to a guide plate 254. Pouring head C is mounted above a moving conveyor 256. A reinforcement sheet 258 of, for example, woven fiberglass is fed in between pouring head C and conveyor 256 to reinforce plaster poured onto conveyor 256 for the formation of a plasterboard building element.

With given rates of introduction of plaster powder and water, the mixing container filling level determines the mean time during which the plaster remains in the mixing container (at least 3 seconds and preferably for 15 to 30 seconds for plaster as well as other evolutive pulps). Heretofore the filling level was attempted to be maintained by varying the rate of introduction of the ingredients while not changing their ratio which is very difficult. In the apparatus of FIG. 5, it is accomplished by the invention by controlling flow through valve V that is made practical by the modulation of the control or sensing signal to valve V to keep the valve clear of any deposits, so that the relationship between the controlling signal and the flow rate of valve V is not changed by deposits in the valve that would partially block the flow through valve V.

Figure 6:
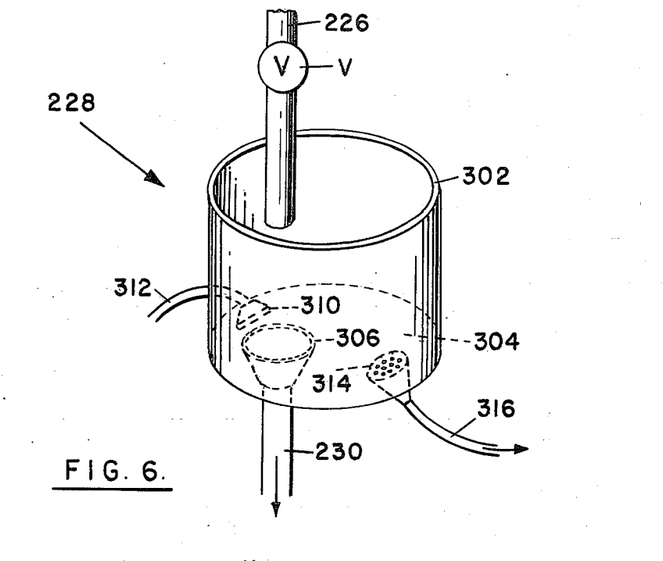
FIG. 6 is a perspective view of a receiving container in accordance with the invention.

As shown in FIG. 6, receiving container 228 is fed by a pipe 226 that discharges into receiving container 228 having an open top 302 and a bottom 304. Discharge pipe 230 is tightly secured to bottom 304 and has a funnel 306 connected to its upper end for reception of material discharged from pipe 226, funnel 306 and pipe 226 being coaxial. A spray nozzle 310 is connected to a water line 312 to flush the bottom 304 in order to wash out any material not collected by funnel 306. A drain 314 in bottom 304 is connected to a discharge line 316. In addition to serving the function of disconnecting mixer 6 from the apparatus downstream of pipe 226 for purposes of weighing mixer 6, receiving container 228 performs the function of preventing the hydrostatic pressure upstream of container 228 from affecting downstream pump 232.

Figure 7:
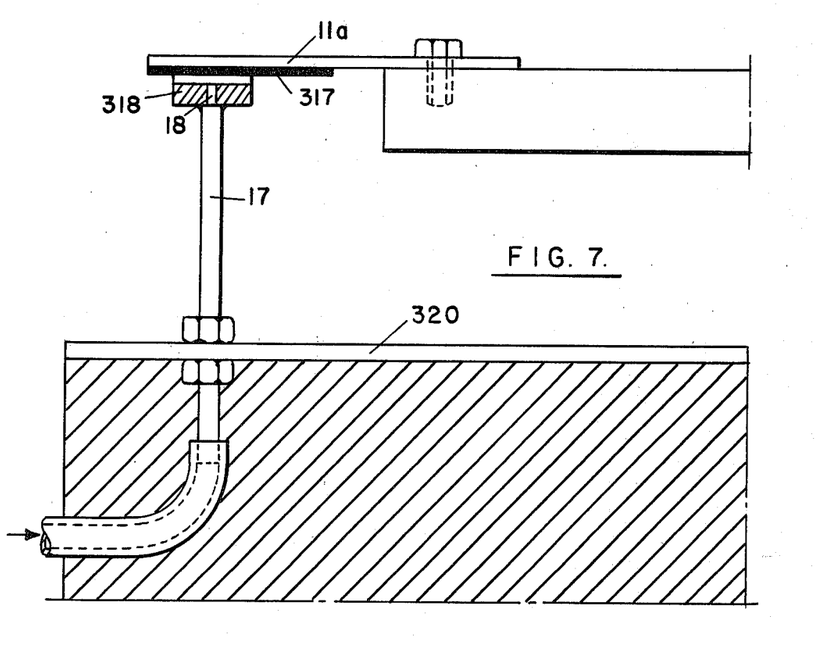
FIG. 7 is an enlarged view of the nozzle 18 and its associated parts.

FIG. 7 is a partial view on an enlarged scale of the apparatus around nozzle 18 of FIG. 4. Pipe 17 extends upwardly to feed the compressed air to nozzle 18 which is protected from being damaged from contact with plate 317 of beam arm 11a by a sturdy nozzle head 318. Pipe 17 is supported by a plate 320. The distance between beam plate 317 and nozzle 18 controls the amount of air vented from pipe 17, and controls the pressure of the air delivered in valve sleeve 3 through control pipe 2.

Figure 8:
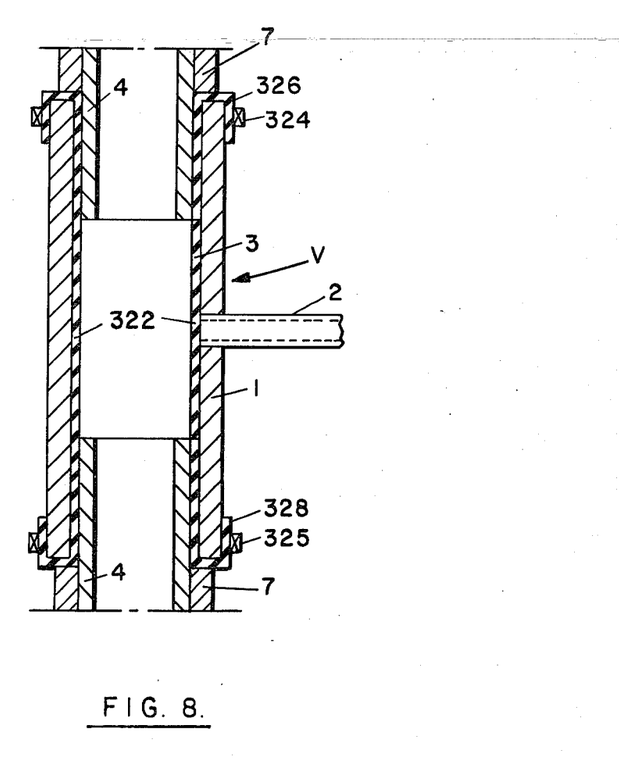
FIG. 8 is an enlarged view in section of the valve V.

FIG. 8 is an enlarged view in longitudinal section of valve V, which is diagrammatically shown in FIG. 1, with control pipe 2, tubes 4 extending into both ends of pipe 1 and clamping the ends of sleeve 3 to the inner surface of pipe 1 except for middle portion 322 which is free to expand inwardly in a star shape when actuated by the compressed air from control pipe 2, and clamps 324, 325 that clamp sleeve ends 326 and 328 to tubes 4. Pipe 1 may be 82 mm long and 33.5 mm in diameter, with the outside diameter of tubes 4 being 32 mm to fasten sleeve 3 between them. The initial length of sleeve 3 may be 140 mm, and 0.8 mm thick. In assembly, the bottom 328 of sleeve 3 may be rolled back and clamped to pipe 1 by clamp 325. Sleeve 3 is then stretched upwardly about 15 mm to keep sleeve 3 in tension, with half the perimeter of the sleeve 3 being about 46 mm and the average diameter of sleeve 3 being about 29 mm. Then upper sleeve end 326 is rolled back onto the upper end of tube 1 and clamped thereto by clamp 324.

The characteristics of the sleeve 3 material is such that a piece 10 cm long and 2 cm wide is stretched by 5 cm when held at the top and a weight of 1.2 kg is applied to its bottom. A very small variation in pressure varies the star shape of sleeve 3.

The invention deals with setting the flow rate of evolutive pulp, but it also deals with the setting of evolutive pulps containing finely broken up inert loads, for instance, chopped fiberglass. Also, the invention deals with setting the flow rate of non-evolutive liquids, whether loaded or non-loaded with finely divided inert loads such as chopped glass fibers.

Therefore, under the term of evolutive pulps, properly speaking, can be included evolutive pulps containing in addition inert loads, and loaded or non-loaded liquids.

Referring again to FIG. 5, it is to be noted that the impeller 22 is driven by a motor 400 that drives a gear box 402 that in turn drives gear box 404 which drives shaft 222. Structural member 406 connects tank 6 and motor 400 so that they are mounted together and are carried by beam arm 410b. Spring 14 and modulating piston 15 are mounted on structural member 412 and are mounted on beam arm 410a. Knife edge 414 is positioned between motor 400 and mixing tank 60 so as to be in a position to maintain the motor and tank in equilibrium with a minimum amount of mixture in the tank.

We claim:

1. For evolutive pulp flow rate setting through piping, a process preventing deposits of said pulp in a narrow channel in said piping comprising:
   subjecting piping portions adjacent the said narrow channel where deposit is likely to occur to constantly varying change of shape while maintaining a continuous flow of pulp through said narrow channel,
   subjecting said piping portions to a star shape with sharp angles,
   and constantly varying the position of said sharp angles to position the sharp angles under any deposits to remove them from the piping.

2. For evolutive pulp flow rate setting through piping by a regulating valve controlled by a regulating signal to provide a selected rate of flow through the piping, a process preventing deposits of said pulp in a narrow channel created by said valve characterized in that it comprises:
   superimposing a pulsating signal on the regulating signal while maintaining a continuous flow of said pulp through the valve,
   said regulating signal forming said valve into a star shape with sharp angles,
   said pulsating signal constantly varying the position of said sharp angles to position the sharp angles under any deposits to remove them from the valve.

3. The process according to claim 1 or claim 2 characterized in that the evolutive pulp is essentially a plaster and water mixture.

4. A process for maintaining a constant amount of evolutive pulp in a mixing container comprising:
   continuously supplying evolutive pulp ingredients to the mixing container,
   continuously withdrawing the evolutive pulp from the mixing container through a line having a valve controlled by a regulating signal,
   supplying a regulating signal to the valve to vary the setting of the valve to maintain a predetermined amount of evolutive pulp in the mixing container,
   superimposing a pulsating signal on the regulating signal to prevent the deposit of pulp in the valve in order to maintain a constant relationship between the regulating signal and the rate of flow of pulp through the valve.

5. A process in accordance with claim 4 including actuating the regulating signal in response to the weight of the evolutive pulp ingredients in the mixing container.

6. A process in accordance with claim 5 including vibrating the mixing container, and actuating the pulsating signal in response to the vibrations of the mixing container.

7. A process in accordance with claim 4 including vibrating the mixing container, and actuating the pulsating signal in response to the vibrations of the mixing container.

8. A process in accordance with any of claims 5 through 6 characterized in that the evolutive pulp is a mixture of plaster powder and water.

9. Evolutive pulp flow rate setting mechanism for controlling the level of evolutive pulp in a mixer receiving a supply of evolutive pulp ingredients continuously comprising:
   a flow rate setting valve controlling the discharge from the mixer,
   means for controlling the valve opening to control said level,
   and modulating means for causing the valve opening to vary either way from a value determined by the control means.

10. A mechanism according to claim 9 in which the flow rate setting valve is an elastic shape changing pneumatic valve comprising: a rigid housing, an inner elastic sleeve, and a valve opening control fluid intake between the housing and the sleeve.

11. A mechanism according to claim 10 in which the elastic sleeve at rest has a substantially uniform diameter not exceeding the inner diameter of the housing, and the sleeve is star-shaped in cross-section when subjected to pressure on the outside of the sleeve and varies in shape of the star when subjected to very little pressure before it varies in the size of the star when subjected to more pressure.

12. A mechanism according to claim 10 in which the valve opening control means comprises a fluid supply under pressure equipped with a pressure regulator and a pressure gauge.

13. A mechanism according to claim 10 in which the means for controlling the valve opening comprises: a control air supply line connected to the control fluid intake of the flow rate setting valve, a pressure regulator in said control air supply line, a vent nozzle communicating with said control air supply line at a point between the pressure regulator and the flow rate setting valve, a force balance beam mounted on a fulcrum with one end secured to the mixer and the other end adjacent said vent nozzle for controlling the amount of air vented through said nozzle, and means for counterbalancing the force balance beam against the weight of the container.

14. A mechanism according to claim 13 in which the modulating means comprises means for oscillating the force balance beam.

15. A mechanism according to claim 14 in which the oscillating means is an impeller in the mixer.

16. A mechanism according to claim 9 in which the flow rate setting valve is an elastic shape-changing pneumatic valve comprising a rigid housing, an inner elastic sleeve, and a valve control fluid intake, the means for controlling the valve opening comprises a control fluid supply line connected to said intake and a pressure regulator, and the modulating means comprises a piston in a cylinder in communication with the fluid supply line and means to reciprocate the piston.

17. The method of preventing the clogging of a valve regulating the rate of flow of a liquid with the valve having an elastic sleeve whose shape is controlled by the pressure of a fluid on the exterior of the elastic sleeve through which the liquid flows and with the pressure being set to a selected value for a selected rate of flow comprising:
   constantly varying the pressure of the fluid above and below said selected value to constantly vary the shape of the sleeve while maintaining a continuous flow of said liquid through the valve,
   said pressure of selected valve forming said sleeve into a star shape with sharp angles,
   said constant varying of the pressure of the fluid acting to constantly vary the position of said sharp angles to position the sharp angles under any deposits to remove them from the sleeve,
   said liquid being air,
   setting the pressure to said selected value by delivering a signal to said sleeve pneumatically directly from a signal generating apparatus without any intermediate amplification,
   whereby the sleeve reacts under very small signals without any substantial change in the cross-sectional area of the sleeve.

18. The method of claim 17 in which the liquid comprises an evolutive pulp.

19. The method of claim 17 in which the liquid comprises a plaster and water mixture.

20. In mechanism for processing evolutive pulp having a mixing container adapted to receive a continuous supply of evolutive pulp ingredients and whose rate of discharge is regulated by a valve having an elastic sleeve through which the pulp is adapted to flow and whose shape is controlled by the pressure of a fluid at the exterior of the sleeve and having means for supplying the fluid to the sleeve at a selected pressure, the improvement comprising:
   means for constantly varying the pressure of the said fluid above and below the selected pressure to constantly vary the shape of the sleeve.

21. In a mechanism for processing evolutive pulp having a mixing container with a discharge opening in its bottom, means for continuously moulding the mixed evolutive pulp, means to convey the mixed evolutive pulp from the discharge opening of the mixing container to the moulding means, and means for delivering a continuous supply of evolutive pulp ingredients to the mixing container, the improvement for maintaining the level of evolutive pulp in the container at a predetermined level to retain the evolutive pulp in the container for a predetermined period of time characterized in that the conveying means includes:
   a conduit connected to the discharge opening,
   a valve controlling the conduit, means for supplying a regulating signal controlling the valve responsive to the weight of the mixing container,
   means for supplying a pulsating signal superimposed on the regulating signal,
   a second conduit downstream of the first conduit and disconnected therefrom for receiving discharge from the first conduit, and, segregating the weight of the mechanism downstream of the first conduit from the weight of the mixing container.

22. The mechanism of claim 21 characterized in that the discharge end of the first conduit and the input end of the second conduit are substantially vertical and coaxial and the input end of the second conduit is funnel-shaped.

23. The mechanism of claim 22 characterized in that the container has a drain, and means to supply a liquid to the interior of the container to flush evolutive pulp out of the container through the drain.

24. The combination of claim 23 characterized in that the second conduit has a funnel-shaped upper end.

25. The mechanism of claim 21 or 22 characterized in that the discharge end of the first conduit and the input end of the second conduit are within a receiving container with the input end of the second conduit above the bottom of said container whereby the evolutive pulp not received by the second conduit is collected in the container.

26. In combination with a mixing tank having first means for weighing the mixing container, a conveyor and second means for discharging material mixed in the mixing tank onto the conveyor, the improvement comprising:
   a receiving container,
   a first conduit communicating with the mixing container and discharging substantially vertically into the receiving container but unconnected thereto, and
   a substantially vertical second conduit coaxial with the first conduit and extending above the bottom of the receiving container to receive the discharge from the first conduit,
   whereby the mixing container may be weighed free of any apparatus beyond the first conduit.

27. The combination of claim 26 characterized in that the receiving container has means to wash out of the receiving container any discharge from the first conduit not received by the second conduit.

28. The valve of claim 27 wherein the first pipe is 82 mm long and 33.5 mm in inside diameter, with the outside of the tubes being 33 mm, the initial length of the sleeve is 140 mm and the initial thickness is 0.8 mm, with the sleeve being stretched upwardly about 15 mm upon installing to keep the sleeve in tension.

29. Evolutive pulp flow rate setting valve comprising: a first pipe, a control pipe connected to the wall of the first pipe for feeding a fluid such as compressed air thereto, a resilient sleeve positioned inside the first pipe with its outer surface at rest in contact with the inner surface of the first pipe and having its ends overlapping the ends of the first pipe and clamped thereto, a tube extending into each end of the first pipe and clamping the ends of the sleeve to the inner surface of the first pipe except for a middle portion which expands inwardly in a star-shape when actuated by the fluid from the control pipe.

30. Apparatus for controlling the level of a mixture in a mixing tank comprising: a balance beam having a fulcrum, and including a first balance arm on one side of the fulcrum and a second balance arm on the other side of the fulcrum, the first balance arm supporting a mixing tank and a control valve for controlling the rate of discharge from the mixing tank, the second balance arm balancing the first arm and the items supported thereby, sensing means for sensing the position of the balance beam as the weight of mixture in the tank varies, and actuating means for controlling the size of the opening in the valve and the rate of discharge of mixture from the mixing tank in response to signals from the sensing means.

31. The apparatus of claim 30, said valve including an elastic sleeve, and means for vibrating the sleeve to prevent deposit thereon of the mixture.

* * * * *